Dec. 10, 1957 W. H. BLISS 2,816,246

SCANNER POSITIONING CONTROL

Filed March 31, 1954 2 Sheets-Sheet 1

INVENTOR.
Warren H. Bliss
BY Morris A. Rabkin
ATTORNEY

Dec. 10, 1957 W. H. BLISS 2,816,246

SCANNER POSITIONING CONTROL

Filed March 31, 1954

2 Sheets-Sheet 2

INVENTOR.
Warren H. Bliss

BY Morris A. Rabkin

ATTORNEY

United States Patent Office 2,816,246

Patented Dec. 10, 1957

2,816,246

SCANNER POSITIONING CONTROL

Warren H. Bliss, Princeton, N. J., assignor to Radio Corporation of America, a corporation of Delaware Application March 31, 1954, Serial No. 420,000

7 Claims. (Cl. 315—10)

Figure 1:
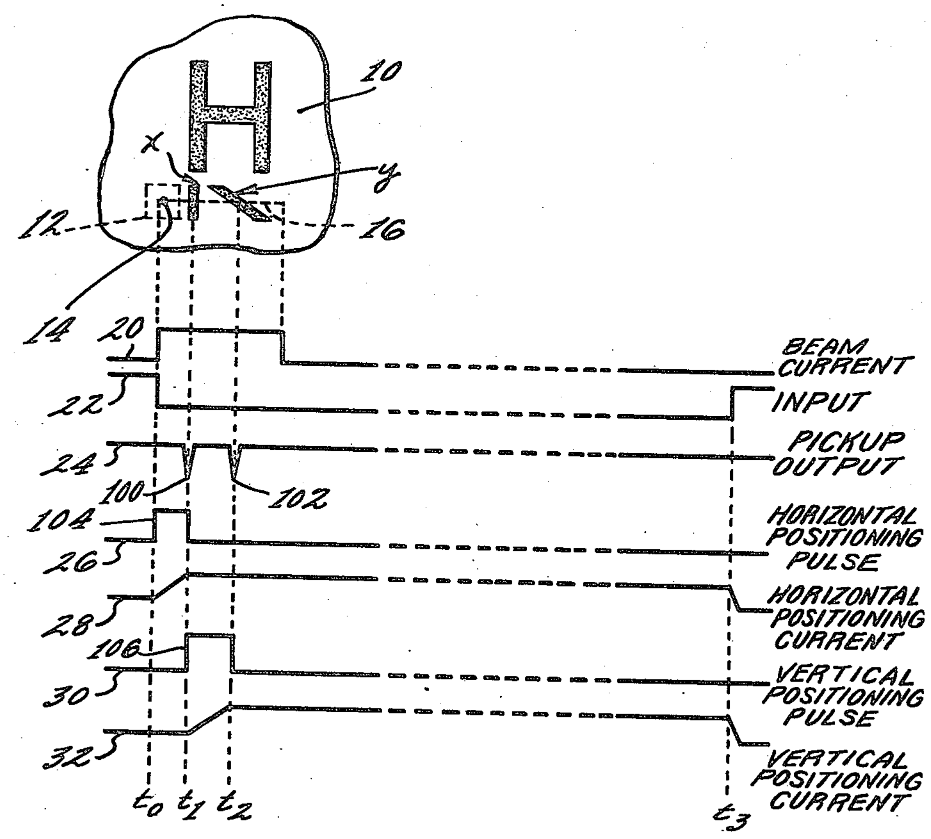

This invention relates to electron beam scanning arrangements and more particularly to novel arrangements for precisely controlling the scanning path of an electron beam.

There are various arrangements for scanning a picture area by means of an electron beam and remotely reproducing the scanned picture area on the screen of a cathode ray tube. In certain applications of this scanning process it is desirable to have the position of the scanning beam precisely controlled. An array of alphabetical and numerical characters or indicia may be selectively scanned in order to produce intelligible configurations of these characters on the screen of a cathode ray tube. The image on the fluorescent screen may be recorded by any means for converting a light image to a permanent image such as photography. This technique may be used to produce printed matter at very high speeds from a coded input signal. It may be used advantageously in a number of related fields including high speed electronic type setting and for recording of coded information derived from high speed computers.

In these processes precise control of the scanning beam is essential for precise vertical alignment and regular horizontal spacing of the reproduced images. To insure accurately aligned and regularly spaced printed matter, the beam must selectively scan the indicia to be reproduced in accordance with a precisely positioned pattern. This invention teaches how the position of the scanning pattern over each of the preselected indicia may be precisely and consistently controlled.

An object of this invention is to provide a method of, and means for, precisely positioning a scanning electron beam in accordance with a defined pattern relative to preselected indicia being scanned;

Another object is to provide a method of, and means for, precisely controlling the starting portion of a scanning electron beam pattern relative to preselected indicia being scanned.

This invention teaches how a scanning electron beam may be positioned to accurately and consistently scan preselected indicia in accordance with a precisely defined pattern. A device constructed in accordance with these teachings utilizes a pair of slits disposed in the starting path of the beam and cooperating with a photosensitive pickup and a pulse generating apparatus. These cooperating elements develop position compensating deflection currents in accordance with the deviation of initial portions of the starting path of the beam from a predefined starting path. These position compensating currents are applied through a beam positioning yoke to deflect the beam into accordance with the defined pattern.

The first slit is vertically disposed and is used to develop the horizontal compensating deflection current. The other slit is slanted and is used to develop the vertical compensating deflection current.

A horizontal positioning pulse is initiated at the time the beam is turned on to scan the indicia or character. It is terminated when the beam traverses the vertically disposed slit. The horizontal starting position of the beam, therefore, determines the strength of the compensating horizontal positioning deflection current.

A vertical positioning pulse is started when the horizontal positioning pulse is terminated. It is cut off when the beam traverses the slanted slit. The vertical position of the starting point of the beam, therefore, determines the duration of the pulse and the strength of the compensating vertical positioning current to be applied to deflect the beam to the predetermined vertical starting point.

By the time that the beam starts to scan the character the compensating deflection has positioned it to scan in accordance with the predefined pattern relative to the character.

Figure 2:
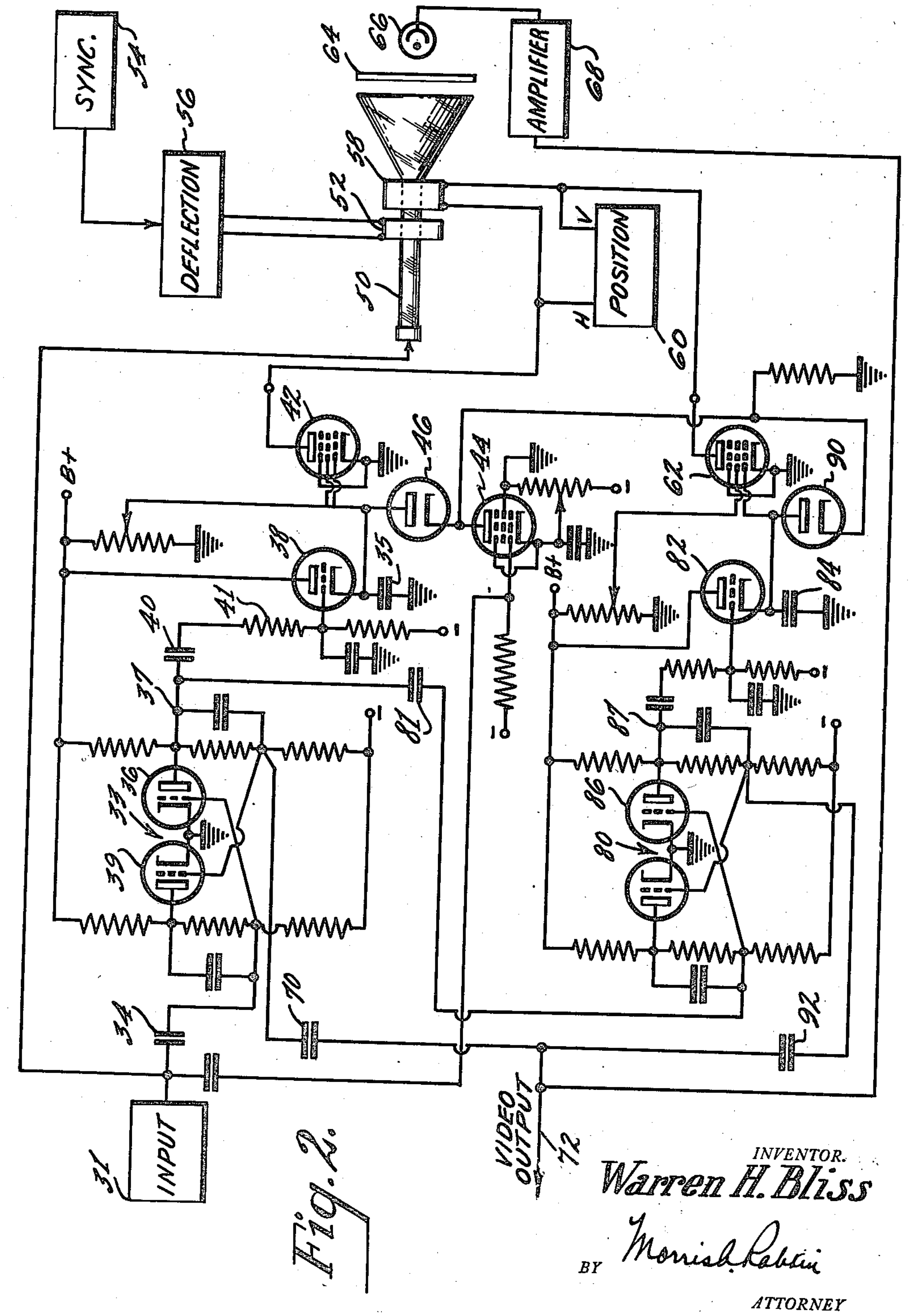

Other objects and advantages of the present invention will become apparent to one skilled in the art from a reading of the following specification in conjunction with the accompanying drawing of an illustrative example practicing the present invention in which:

Fig. 1 is a schematic diagram of the initial beam scanning path in preparation for scanning a preselected character together with various waveforms utilized in practicing the invention; and Fig. 2 is a schematic diagram of an illustrative scanner positioning device embodying the invention.

In Fig. 1 is shown a section of a letter chart 10 which may be scanned by an electron beam. This letter chart may be part of an array of alphabetical and numerical characters or indicia which are selectively scanned by an electron beam to provide an intelligible array of electron beam images of these characters on a reproducing cathode ray tube screen. The letter H is shown on the chart. The letter itself may be transparent and the background may be opaque. Two position control slits *x* and *y* are located close to the letter in the position shown. The slits are positioned close to the area within which the scanning beam starts its sweep. The beam starting area is designated by the square 12. The beam starting point is designated by the point 14 and an actual beam path is designated by the line 16. The transparent slot *x* is a vertical slot located just below the lower left hand corner of the letter. The transparent *y* slot is located to the right of the first slot and it slants down in going from left to right.

Various wave forms are derived during the cycle of operation in the various parts of the circuit to be later described. These may be designated as the beam current wave form 20; the input wave form 22, the pickup output wave form 24, the horizontal positioning current 28, the horizontal positioning pulse wave form 26, the horizontal positioning current 28, the vertical positioning pulse wave form 30 and the vertical positioning current 32. The critical time points of the cycle in relationship to these various wave forms are designated as *t0*, *t1*, *t2* and *t3*. The significance of these points in time will be later described. The relationship between these wave forms and the path of the scanning beam is indicated by the dotted lines representing points of time at various points along the path of the beam.

In Fig. 2 a source of an input signal which may be a single shot multivibrator 31 is connected in triggering relationship to the locking multivibrator 33 through a differentiating condenser 34. The input single shot multivibrator itself may receive an input signal from apparatus (not shown) when the beam has been positioned to commence the scanning of the preselected character. It is also connected to the cathode ray tube input to serve as an unblanking multivibrator. The output terminal 37 of multivibrator 33 is connected to the grid of integrater triode 38 by way of condenser 40 and resistor 41. An integrating condenser 35 is connected from the cathode of triode 38 to ground. The condenser 35 is also connected to the control grid of a horizontal deflection driver tube 42 which may be a pentode, and to the output circuit of a reset tube 44 through a diode 46.

A scanning cathode ray tube 50 has a scanning deflection yoke 52 of the well known type having horizontal and vertical scanning deflection elements (not shown). The horizontal and vertical scanning signals are produced by a sync. generator 54 connected to the yoke through a means 56 for developing beam deflecting signals of the well known sawtooth variety. This scanning generator arrangement may develop a scanning pattern similar to the standard television scanning pattern, however, the present scanning path need not be interlaced.

A positioning deflection yoke 58 is also placed about the tube neck. It may have horizontal and vertical beam positioning elements (not shown). These elements may be deflection coils of the well known magnetic deflection variety. A device 60 for providing beam positioning current to the yoke 58 has leads for providing a horizontal beam positioning deflection current and a vertical beam deflection current to the deflection yoke 58. These leads are marked H and V respectively. The horizontal driver tube 42 and a corresponding vertical driver tube 62 are connected through respective horizontal and vertical input leads to the positioning deflection yoke 58. A letter chart 64 which may be opaque has an array of transparent characters and slots similar to those shown in Fig. 1. This chart is disposed on the front of the scanning cathode ray tube face. A photosensitive pickup 66 is disposed in back of the chart 64. The photosensitive pickup is connected to the locking multivibrator 33 trigger circuit through an amplifier 68 and a condenser 70. A video output for the reproducing kinescope (not shown) may be derived from the amplified output at 72.

A vertical deflection circuit similar to the horizontal deflection circuit is made up of the locking multivibrator 80, the integrating triode 82, the condenser 84 connected in the cathode circuit of the integrating tube 82. The condenser 84 is connected in the horizontal deflection circuit to the vertical driver tube 62. The diode 90 connects the condenser 84 to the reset tube 44 in a similar manner as shown in the circuit for horizontal deflection. An amplified photosensitive pickup output signal is provided to the vertical locking multivibrator 80 through condenser 92. The beam is caused to scan the preselected letter along a precisely positioned predetermined pattern by controlling the initial path or starting portion of the beam in the following manner. The beam is turned on somewhere in area 12, for example, at point 14. As the beam sweeps along the line 16 and traverses slits $x$ and $y$, it causes pulses 100 and 102 (waveform 24) to be developed in the photopickup 66 and amplifier 68. These pulses are used together with a pulse initiated at the beam starting instant to generate two positioning pulses 104 and 106 in the horizontal positioning and vertical positioning circuits respectively. These positioning pulses vary in length depending upon where the beam starting point 14 originates within area 12. The positioning pulses are integrated to produce horizontal and vertical positioning currents (waveforms 28 and 32) which are introduced into the scanner deflection yoke to shift the beam to scan in the precisely positioned predetermined pattern.

The input source 31 which may be a single shot multivibrator supplies a negative square wave of voltage as shown by waveform 22. The single shot multivibrator 31 by its connection to the cathode of cathode-ray tube 50 may also serve as an unblanking multivibrator of the well known type. At the time $t_0$ the beam of the cathode ray tube 50 is turned on by the leading edge of the negative square voltage waveform 22. This time $t_0$ may also correspond with the time that the beam deflection positioning device 60 has positioned the beam within the starting area 12 to scan the preselected letter H. At $t_3$ the input waveform 22 returns to normal.

Multivibrator 33 normally has its right hand section 36 conducting. This maintains point 37 at a relatively low potential. At time $t_0$ the unblanking multivibrator signal is differentiated through condenser 34 to trip the multivibrator 33 into its other stable state with the left hand triode 39 conducting. As the beam sweeps across the transparency $x$, it causes pulse 100 to be produced in the photosensitive pickup 66 and in the amplifier 68. This pulse is applied via condenser 70 to trip multivibrator 33 back to normal with its right hand section 36 conducting at time $t_1$. The output of multivibrator 33 derived from point 37 consists of the square pulse 104 in wave form 26.

This positive polarity square pulse 104 is applied to the normally cutoff grid of integrater triode 38 to charge condenser 35 through triode 38. The potential to which condenser 35 is charged depends upon the length of pulse 104. The horizontal positioning current developed by this pulse is shown in wave form 28. The potential developed by this current brings the control grid of driver tube 42 up to a point where conduction takes place. A component of horizontal deflection current may, therefore, be drawn through the horizontal positioning deflection coil within the yoke 58.

If the beam starts near the center of the area 12, a nominal value of position deflection current is drawn by driver 42. This indicates that the initial starting position of the beam is horizontally correct. If the beam starts toward the left side of area 12 pulse 104 will start at an earlier time. Pulse 104 will therefore be longer. It will therefore charge condenser 35 to a higher potential. This in turn causes tube 42 to draw more deflection current than previously. This correcting deflection current positions the beam in the proper horizontal direction to properly scan the preselected character H if the circuit elements are properly adjusted. As the horizontal position of the starting path of the beam varies, the positioning current drawn by the tube 42 compensates for this variation to position the starting point of the beam in a predetermined horizontal position to scan the preselected letter along the properly positioned scanning pattern.

At the end of the character scanning period, at time $t_3$ condenser 35 is discharged back to its initial condition by tube 44. The differentiated trailing end of the multivibrator 31 output momentarily swings the grid of tube 44 above cutoff. This causes the potential of the plate of tube 44 to drop to a negative value. Condenser 35 is therefore discharged through diode 46.

The circuit action in producing correct vertical alignment of the beam is similar to that described for producing the horizontal alignment. Multivibrator 80 has its right hand section 86 normally conducting. At time $t_1$ when multivibrator 33 returns to normal, it triggers multivibrator 80 through condenser 81. Pulse 100 from the pickup 66 and amplifier 68 occurs at this same instant. It is applied simultaneously to multivibrator 80 through condenser 92. Pulse 100 however, has no effect because it is overpowered by the higher potential pulse from multivibrator 33.

Pulse 102 occurs when the initial beam sweep passes transparency $y$. The time that this occurs, $t_2$, varies with the vertical position of the beam starting path. This pulse trips multivibrator 80 back to normal through condenser 92. The resulting pulse 106 produced at circuit point 87 is integrated into condenser 84. This condenser controls a component of vertical deflection current (wave form 32) through tube 62. The value of this current depends upon the vertical position of the starting point of the beam. The vertical positioning of the beam starting path will be accurately corrected in a similar manner to the horizontal positioning correction. If the beam starting point is high, less beam correction deflecting current will be developed. If the starting path of the beam is low, the pulse 106 will be longer and more vertical deflection current will be developed to deflect the starting path of the beam back into its predetermined scanning path. Condenser 34 is also discharged by tube 44 through a diode 90 at the end of each letter scanning.

What is claimed is:

1. An arrangement for positioning a scanning electron beam in accordance with a precisely defined pattern relative to preselected indicia being scanned in response to a signal from an input source comprising means connected to said input source for turning on and initiating the scanning movement of said electron beam in response to said input signal, means connected to said input source for developing a pulse in response to said input signal, means connected to said pulse developing means for developing a beam deflecting signal of magnitude varying with the duration of said pulse, means connected to said pulse developing means for terminating said pulse, and said terminating means including means disposed in a predetermined spacial relationship relative to said indicia for generating a terminating impulse when traversed by said scanning electron beam.

2. An arrangement for precisely controlling the starting portion of a scanning electron beam pattern relative to preselected indicia being scanned in response to a signal from an input source comprising multivibrator means for initiating horizontal and vertical beam positioning pulses in response to said input signal, condenser means being connected in charging relationship with said multivibrator means, said condenser means being connected in the grid circuit of horizontal and vertical positioning driver tubes for controlling said driver tubes to provide horizontal and vertical deflecting currents of a magnitude varying with the duration of said horizontal and vertical positioning pulses, a photosensitive pulse generating device, slits disposed relative to said indicia for allowing said beam to impinge upon said photosensitive pulse generating device when traversed by said scanning electron beam, and said photosensitive pulse generating device being connected to trigger said multivibrator means to terminate said beam positioning pulses when said beam traverses said slits.

3. The combination set forth in claim 2 wherein said slits are comprised of a vertically disposed horizontal positioning slit and a slanted vertical positioning slit.

4. The combination set forth in claim 2 wherein discharge means is connected to said condenser means, said discharge means being connected to said input source for discharging said condenser means in response to terminating of a pulse of said input signal.

5. The combination set forth in claim 2 wherein said multivibrator means is comprised of a horizontal positioning multivibrator and a vertical positioning multivibrator, said horizontal multivibrator being coupled to said vertical multivibrator for triggering said vertical multivibrator in response to cutoff of said horizontal multivibrator.

6. An arrangement for precisely controlling the starting portion of a scanning electron beam pattern relative to preselected indicia being scanned in response to a signal from an input source, comprising a multivibrator for initiating a horizontal beam positioning pulse in response to said input signal, a condenser connected in charge relationship with said multivibrator and connected in the grid circuit of a horizontal positioning driver tube for controlling said driver tube to provide a horizontal beam deflecting current of a magnitude varying with the duration of said horizontal beam positioning pulse, a photosensitive pulse generating device, a slit disposed relative to said indicia for allowing said beam to impinge upon said photosensitive pulse generating device when traversed by said scanning electron beam, said photosensitive pulse generating device being connected to trigger said horizontal multivibrator means to terminate said horizontal beam positioning pulse when said beam traverses said slit, a multivibrator for initiating a vertical beam positioning pulse connected to said horizontal positioning multivibrator by a coupling means, said coupling means allowing said vertical multivibrator to initiate a vertical beam positioning pulse in response to termination of said horizontal beam positioning pulse, a second slit disposed relative to said indicia for allowing said beam to impinge upon said photosensitive pulse generating device when traversed by said scanning electron beam, and said second slit being connected to trigger said vertical multivibrator to terminate said vertical beam positioning pulse when said beam traverses said second slit.

7. An arrangement for positioning a scanning electron beam relative to preselected indicia being scanned in response to a signal from an input source comprising horizontal pulse developing means connected to said input source, said horizontal pulse developing means including means for initiating a horizontal beam positioning pulse in response to said input signal, means connected to said horizontal pulse developing means for developing a horizontal beam deflecting signal of a magnitude corresponding to the duration of said horizontal pulse, means disposed in a predetermined horizontal spacial relationship relative to said indicia for generating a horizontal pulse terminating impulse when traversed by said scanning electron beam, vertical pulse developing means, coupling means connecting said vertical pulse developing means with said horizontal pulse developing means, said coupling means including means for triggering said vertical pulse developing means to initiate a vertical positioning pulse in response to the termination of said horizontal positioning pulse, means connected to said vertical pulse developing means for developing a vertical beam deflecting signal of a magnitude corresponding to the duration of said vertical positioning pulse, and means disposed in a predetermined vertical spacial relationship relative to said indicia for generating a vertical pulse terminating impulse when traversed by said scanning electron beam.

References Cited in the file of this patent

UNITED STATES PATENTS

| | | |
|---|---|---|
| 2,540,016 | Sunstein | Jan. 30, 1951 |
| 2,630,548 | Muller | Mar. 3, 1953 |
| 2,634,325 | Bond et al. | Apr. 7, 1953 |
| 2,657,257 | Lesti | Oct. 27, 1953 |